United States Patent
Park et al.

(10) Patent No.: US 9,546,248 B2
(45) Date of Patent: *Jan. 17, 2017

(54) POLYARYLENE SULFIDE HAVING EXCELLENT PROCESSABILITY AND PREPARATION METHOD THEREOF

(75) Inventors: Kyu-Tae Park, Gyeonggi-do (KR); Sung-Gi Kim, Gyeonggi-do (KR); Jae-Bong Lim, Gyeonggi-do (KR); Il-Hoon Cha, Seoul (KR); Se-Ho Lee, Gyeonggi-Do (KR)

(73) Assignee: SK Chemicals Co., Ltd., Gyeonggi-Do (KR)

(*) Notice: Subject to any disclaimer, the term of this patent is extended or adjusted under 35 U.S.C. 154(b) by 63 days.

This patent is subject to a terminal disclaimer.

(21) Appl. No.: 13/697,282

(22) PCT Filed: May 6, 2011

(86) PCT No.: PCT/KR2011/003387
§ 371 (c)(1),
(2), (4) Date: Jan. 16, 2013

(87) PCT Pub. No.: WO2011/142557
PCT Pub. Date: Nov. 17, 2011

(65) Prior Publication Data
US 2013/0115438 A1    May 9, 2013

(30) Foreign Application Priority Data

May 12, 2010  (KR) .................. 10-2010-0044482

(51) Int. Cl.
*C08G 75/00* (2006.01)
*C08G 75/14* (2006.01)
(Continued)

(52) U.S. Cl.
CPC .......... *C08G 75/14* (2013.01); *C08G 75/0204* (2013.01); *C08L 81/02* (2013.01); *Y10T 428/249921* (2015.04)

(58) Field of Classification Search
CPC . C08G 75/14; C08G 75/0263; C08G 75/0268; C08G 75/0259; C08G 75/025; B30B 9/28
(Continued)

(56) References Cited

U.S. PATENT DOCUMENTS 2,513,188 A    6/1950   Macallum
2,583,941 A    1/1952   Gordon, Jr.
(Continued)

FOREIGN PATENT DOCUMENTS

CN    1220678 A    6/1999
CN    1918214 A    2/2007
(Continued)

OTHER PUBLICATIONS

"Chinese Application Serial No. 201180033792.7, Office Action mailed Jan. 17, 2014", 9 pgs.
(Continued)

*Primary Examiner* — Shane Fang
(74) *Attorney, Agent, or Firm* — Schwegman Lundberg & Woessner, P.A.

(57) ABSTRACT

The present invention relates to polyarylene sulfide, in which a ratio of a peak area of a polymer chain of a second polyarylene sulfide having a lower molecular weight than the maximum peak molecular weight to a peak area of a polymer chain of a first polyarylene sulfide having a higher molecular weight than the maximum peak molecular weight is 1.3 or less in the molecular weight distribution of the polyarylene sulfide, as measured by gel permeation chromatography using polystyrene as a standard, and a preparation method thereof. This polyarylene sulfide exhibits (Continued)

excellent processability and generates no burrs (flashes) or the like, and can satisfactorily mold a product requiring high molding precision.

21 Claims, 2 Drawing Sheets

(51) Int. Cl.
 *C08G 75/02* (2016.01)
 *C08L 81/02* (2006.01)
(58) Field of Classification Search
 USPC .................................. 528/381, 389, 373, 388
 See application file for complete search history.

(56) References Cited

U.S. PATENT DOCUMENTS

| | | | |
|---|---|---|---|
| 4,786,713 | A | 11/1988 | Rule et al. |
| 4,792,600 | A | 12/1988 | Rule et al. |
| 4,826,956 | A | 5/1989 | Fagerburg et al. |
| 4,945,155 | A | 7/1990 | Fagerburg et al. |
| 4,977,224 | A | 12/1990 | Watkins et al. |
| 5,334,701 | A | 8/1994 | Ash et al. |
| 5,360,890 | A | 11/1994 | Tanaka et al. |
| 5,789,533 | A | 8/1998 | Yamanaka et al. |
| 8,242,233 | B2 | 8/2012 | Lee et al. |
| 8,492,502 | B2 | 7/2013 | Lee et al. |
| 2009/0203872 | A1 | 8/2009 | Lee et al. |
| 2010/0022743 | A1* | 1/2010 | Lee et al. ............... 528/389 |

FOREIGN PATENT DOCUMENTS

| | | | |
|---|---|---|---|
| CN | 101578322 | A | 11/2009 |
| CN | 101595165 | A | 12/2009 |
| EP | 0316078 | A2 | 5/1989 |
| EP | 0354133 | A1 | 2/1990 |
| JP | 03500901 | A | 2/1991 |
| JP | 05043690 | | 2/1993 |
| JP | 05501732 | A | 4/1993 |
| JP | 05163349 | A | 6/1993 |
| JP | 08-269199 | A | 10/1996 |
| JP | 0971653 | A | 3/1997 |
| JP | 09286860 | A | 11/1997 |
| JP | 11263843 | A | 9/1999 |
| JP | 2000508359 | A | 7/2000 |
| JP | 2010501661 | A | 1/2010 |
| JP | 2013522385 | A | 6/2013 |
| JP | 2013522386 | A | 6/2013 |
| WO | WO-8908674 | A1 | 9/1989 |
| WO | WO-2005/078006 | A1 | 8/2005 |
| WO | WO-2008/023915 | A1 | 2/2008 |
| WO | WO-2008/082267 | A1 | 7/2008 |
| WO | WO-2011/142557 | A2 | 11/2011 |

OTHER PUBLICATIONS

"International Application Serial No. PCT/KR2011/003387, International Search Report mailed Feb. 6, 2011", (w/ English Translation), 9 pgs.

"International Application Serial No. PCT/KR2011/003387, International Preliminary Report on Patentability mailed Nov. 13, 2012", 11 pgs.

"International Application Serial No. PCT/KR2011/003387, Written Opinion mailed Feb. 6, 2011", 6 pgs.

"Taiwanese Application Serial No. 100116707, Office Action mailed Dec. 31, 2015", w/o English Translation, 4 pgs.

"European Application Serial No. 11780774.3, European Search Report Aug. 8, 2016", (Aug. 8, 2016), 9 pgs.

* cited by examiner

US 9,546,248 B2

POLYARYLENE SULFIDE HAVING EXCELLENT PROCESSABILITY AND PREPARATION METHOD THEREOF

CROSS REFERENCE TO RELATED APPLICATION

This application is a nationalization under 35 U.S.C. 371 of PCT/KR2011/003387, filed May 6, 2011 and published as WO 2011/142557 A2 on Nov. 17, 2011, which application claims priority to and the benefit of Korean Patent Application No. 10-2010-0044482, filed May 12, 2010, which applications and publication are incorporated herein by reference in their entirety.

TECHNICAL FIELD

The present invention relates to polyarylene sulfide (PAS) that exhibits excellent processability and generates no burrs (flashes) or the like, and can satisfactorily mold a product requiring high molding precision, and a preparation method thereof.

BACKGROUND OF THE ART

As a typical engineering plastic, polyarylene sulfide has recently been in considerable demand as a material for high temperature and corrosive environments and electronic products due to its excellence in thermal resistance, chemical resistance, flame resistance, and electrical insulation properties. Polyarylene sulfide is primarily used for computer parts, automotive components, protective coatings against corrosive chemicals, industrial chemical resistant fabrics, and so forth.

The only polyarylene sulfide that is commercially available is polyphenylene sulfide (hereinafter referred to as PPS). The current industrial synthesis process for PPS involves a reaction of p-dichlorobenzene (hereinafter referred to as pDCB) and sodium sulfide in a polar organic solvent such as N-methylpyrrolidone. This process is known as the Macallum process, which is based on U.S. Pat. Nos. 2,513,188 and 2,583,941. Although some other types of usable polar solvents have been proposed in the PPS commercial production process, the mostly used one is N-methylpyrrolidone. The PPS production process is generally conducted using dichloro aromatic compounds as a reactant and yields sodium chloride as a byproduct.

Meanwhile, PPS obtained in the Macallum process generally has high flowability, and thus is able to mold a product even at a low pressure. Therefore, it has been known to have high processability. However, when PPS is used to form products requiring high precision or having a flat shape, such as a variety of computer parts or electronic products, burrs (flashes) are generated on the molded products, and thus there is a limit in its application to the production of precision parts.

DETAILED DESCRIPTION OF THE INVENTION

Technical Objectives

An object of the present invention is to provide a polyarylene sulfide that exhibits excellent processability and generates no burr or the like, and can satisfactorily mold a product requiring high molding precision.

Another object of the present invention is to provide a preparation method of the polyarylene sulfide.

Still another object of the present invention is to provide molded products, films, sheets, or fabrics composed of the polyarylene sulfide.

Technical Solutions

The present invention provides polyarylene sulfide in which a ratio of a peak area of a polymer chain of a second polyarylene sulfide having a lower molecular weight than the maximum peak molecular weight to a peak area of a polymer chain of a first polyarylene sulfide having a higher molecular weight than the maximum peak molecular weight is 1.3 or less in the molecular weight distribution of the polyarylene sulfide, as measured by gel permeation chromatography using polystyrene as a standard.

Further, the present invention provides a method for preparing the polyarylene sulfide, including the steps of polymerizing reactants including a diiodo aromatic compound and a sulfur compound, and further adding the sulfur compound of 0.01 to 30 parts by weight, preferably 0.1 to 20 parts by weight, more preferably 1.0 to 15 parts by weight, based on 100 parts by weight of the sulfur compound included in the reactants, while maintaining the polymerization step.

Further, the present invention provides products manufactured by molding the polyarylene sulfide.

Hereinafter, the polyarylene sulfide, the preparation method of polyarylene sulfide, and the products manufactured by molding the polyarylene sulfide according to the specific embodiments of the present invention will be described in detail.

According to one embodiment, the present invention provides polyarylene sulfide in which a ratio of a peak area of a polymer chain of a second polyarylene sulfide having a lower molecular weight than the maximum peak molecular weight to a peak area of a polymer chain of a first polyarylene sulfide having a higher molecular weight than the maximum peak molecular weight is 1.3 or less in the molecular weight distribution of the polyarylene sulfide, as measured by gel permeation chromatography using polystyrene as a standard.

The present inventors made many efforts to develop polyarylene sulfide that exhibits excellent processability and generates no burrs or the like, and that can satisfactorily mold a product requiring high molding precision, thereby completing the present invention.

When computer parts or electronic products requiring high molding precision are molded using the conventional polyarylene sulfide, there is a problem that polyarylene sulfide having high flowability flows out through gaps in the cast for molding to generate burrs around the molded products. That is, an additional process should be performed to remove burrs, which makes the molding process complicated. In addition, there is concern about causing molding defects of the products by the burr generation.

The term "burr (flash)" means that the molten resin leaking out of the coated surface of the cast sticks to the molded products in a form of thin film. Such burrs may be generated because of injection conditions such as excessively high injection pressure, defects in the cast, or the like, or may be basically generated because of extremely high flowability of the resin. Throughout the present specification, burrs are defined to be generated by the latter problem.

Meanwhile, the term "number average molecular weight" throughout the present specification, unless otherwise specified, is defined as an average molecular weight of the polyarylene sulfide, which is calculated by the following Formula 1 in the molecular weight distribution curve of the polyarylene sulfide as measured by GPC using polystyrene as a standard.

$$\overline{M_n} = \frac{w}{\sum N_i} = \frac{\sum M_i N_i}{\sum N_i} \quad \text{[Formula 1]}$$

Herein, w represents a total weight of the subject polyarylene sulfide, Mi represents a molecular weight of a polymer chain of a specific polyarylene sulfide included in the subject polyarylene sulfide, and Ni represents the number of moles of those with a molecular weight of Mi among the polymer chains of the polyarylene sulfide included in the subject polyarylene sulfide.

Further, the term "maximum peak point" or "maximum peak molecular weight" throughout the present specification is defined as a molecular weight of a polymer chain showing the maximum voltage (voltage designated as millivolts measured by an RI detector in the measurement of molecular weight distribution by gel permeation chromatography) in the subject polyarylene sulfide in the molecular weight distribution curve of the polyarylene sulfide as measured by gel permeation chromatography (GPC) using polystyrene as a standard.

Meanwhile, the present inventors were able to prepare polyarylene sulfide by the afore-mentioned method, in which a ratio of a peak area of a polymer chain of a second polyarylene sulfide having a lower molecular weight than the maximum peak molecular weight (namely, a polymer chain having a longer retention time based on the maximum peak point in the molecular weight distribution curve as measured by GPC) to a peak area of a polymer chain of a first polyarylene sulfide having a higher molecular weight than the maximum peak molecular weight (namely, a polymer chain having a shorter retention time based on the maximum peak point in the molecular weight distribution curve as measured by GPC) is within the same range in the molecular weight distribution of the polyarylene sulfide, as measured by gel permeation chromatography (hereinafter referred to as GPC) using polystyrene as a standard. In particular, the present inventors found that the polyarylene sulfide having a non-excessive content of the polymer chain having a lower molecular weight than the maximum peak molecular weight and showing the molecular weight distribution curve similar to the normal distribution curve of a single peak exhibits excellent processability and generates no burrs or the like so as to satisfactorily mold products requiring high molding precision, thereby completing the present invention.

In the polyarylene sulfide according to one embodiment of the present invention, a ratio of a peak area of a polymer chain of the second polyarylene sulfide having a lower molecular weight than the maximum peak molecular weight to a peak area of a polymer chain of the first polyarylene sulfide having a higher molecular weight than the maximum peak molecular weight is 1.3 or less in the molecular weight distribution of the polyarylene sulfide, as measured by gel permeation chromatography using polystyrene as a standard.

In the molecular weight distribution of the polyarylene sulfide, a ratio of a peak area of a polymer chain of the second polyarylene sulfide having a lower molecular weight than the maximum peak molecular weight to a peak area of the polymer chain of the first polyarylene sulfide having a higher molecular weight than the maximum peak molecular weight has the lowest limit of 1 or more, and thus the ratio of the peak area of the polymer chain of the second polyarylene sulfide having a lower molecular weight than the maximum peak molecular weight is the same as or higher than that of the peak area of the polymer chain of the first polyarylene sulfide.

Meanwhile, the molecular weight distribution curves of the polyarylene sulfide according to embodiments of the present invention are shown in FIGS. 1 and 2. As shown in FIGS. 1 and 2, the molecular weight distribution is found to be similar to the normal distribution curve. The polyarylene sulfide according to the above-described embodiment appears as a single peak in the molecular weight distribution curve, which is similar to the normal distribution curve.

The experimental results of the present inventors show that the polyarylene sulfide having such molecular weight distribution characteristics has appropriate flowability so as to show processability that is equivalent to or higher than that previously known, and can be used to satisfactorily form products requiring high precision or having a flat shape without generation of burrs (flashes) or the like during molding of the polyarylene sulfide.

Because the contents of the polymer chain of the first polyarylene sulfide having a higher molecular weight than the maximum peak molecular weight and the polymer chain of the second polyarylene sulfide having a lower molecular weight than the maximum peak molecular weight in the polyarylene sulfide are almost the same, the flowability of the polyarylene sulfide can be optimized, and the amount of burrs (flashes) generated during molding due to excessively high flowability can also be minimized.

Therefore, the polyarylene sulfide according to the embodiment exhibits excellent processability and generates no burrs or the like, and can be used to satisfactorily form a variety of electronic products requiring high precision.

The polyarylene sulfide according to the above-described embodiment shows a molecular weight distribution curve similar to the normal distribution curve. More specifically, a ratio of the peak area of the polymer chain of the second polyarylene sulfide to the peak area of the polymer chain of the first polyarylene sulfide may be preferably 1.2 or less, and more preferably 1.1 or less in the molecular weight distribution of the polyarylene sulfide as measured by GPC using polystyrene as a standard.

In this regard, the polymer chain of the first polyarylene sulfide has a molecular weight of 12,000 to 900,000, and the polymer chain of the second polyarylene sulfide has a molecular weight of 330 to 80,000.

Such polyarylene sulfide may have a number average molecular weight of 3,000 to 100,000, and a maximum peak molecular weight of 12,000 to 60,000. The number average molecular weight may also preferably be 3,000 to 100,000, more preferably 3,000 to 50,000, and most preferably 5,000 to 30,000.

Further, such polyarylene sulfide may have a polydispersity index of 2.0 to 4.0, which is defined as a ratio of the weight average molecular weight to the number average molecular weight, indicating a relatively uniform distribution.

The polyarylene sulfide having the above number average molecular weight and/or polydispersity index may be applied to various products according to the molecular weight or the melt viscosity.

Meanwhile, the polyarylene sulfide according to the above-described embodiment shows excellent thermal stability, and its melting point (Tm) is preferably 265 to 320° C., more preferably 268 to 290° C., and even more preferably 270 to 285° C. Owing to the high melting point (Tm), the polyarylene sulfide of the present invention exhibits excellent performance such as high strength and improved thermal resistance when applied as an engineering plastic.

Further, the polyarylene sulfide according to the above-described embodiment shows excellent flowability. Specifically, when the polyarylene sulfide according to the above-described embodiment is melted in an injection machine, and then injected under the conditions of a maximum injection pressure of 1500 kgf/cm$^2$, an injection volume of 20 ml, each injection speed of 30 mm/s, 30 mm/s, and 25 mm/s, an injection pressure of 1450 kgf/cm$^2$, an injection temperature of 320° C. in the injection machine with a spiral mold which has a longitudinal section having a semi-circular flow path with a diameter of 6 mm and a maximum height of 2.6 mm, and a cross-section having a spiral flow path with a length of 150 mm, the injection-molded product has a length of 40 cm or longer and thus shows excellent flowability. The injection-molded product may have a length of 50 cm or longer, and more preferably 60 cm or longer. Therefore, it is advantageous in that a further molding process can be easily performed owing to the proper flowability.

Meanwhile, some of the resins having excellent flowability may generate a lot of burrs, which requires an additional process of removing the generated burrs. Thus, the molding process becomes complicated, and the burr generation may cause molding defects of the products. The polyarylene sulfide according to the above-described embodiment of the present invention shows a burr generation weight ratio of 1% by weight or less, which is defined as the amount of generated burrs to the weight of the injection-molded product injected in the above described spiral-shaped injection machine, and thus burrs are rarely generated.

The polyarylene sulfide generates no burrs (flashes) during molding of computer parts or electronic products requiring high precision, and therefore, it can be useful for molding the products requiring high precision.

In the polyarylene sulfide according to the above described embodiment, an amount of a disulfide repeating unit included in the polymer may be 3% by weight or less, based on the total weight of polyarylene sulfide.

This generation may be attributed to the exchange reaction of the sulfur compound that is additionally injected during polymerization.

On the other hand, another embodiment of the present invention provides a method for preparing the polyarylene sulfide, including the steps of polymerizing reactants including a diiodo aromatic compound and a sulfur compound, and further adding 0.01 to 30 parts by weight of the sulfur compound based on 100 parts by weight of the sulfur compound included in the reactants while maintaining the polymerization step.

In the above preparation method, the further addition of a trace amount of the sulfur compound during the reaction may cause formation of disulfide bonds in the polymer. The disulfide bonds continuously cause an equilibrium reaction, a sulfur exchange reaction, with the polymer chains included in the polyarylene sulfide, so as to equalize the molecular weights of the polymer chains included in the polyarylene sulfide. In particular, the equilibrium reaction, the sulfur exchange reaction, can equalize the polymerization degree of the overall reactants, and thus prevent formation of polyarylene sulfide polymer chains having excessively high or low molecular weights. Consequently, polyarylene sulfide having the above-described molecular weight distribution can be prepared.

The amount of the sulfur compound further added during the polymerization step may be within the above-described range, and is preferably 0.1 to 20 parts by weight, and more preferably 1.0 to 15 parts by weight, based on 100 parts by weight of the sulfur compound included in the initial reactants.

The time of further adding the sulfur compound during the polymerization is not limited, as long as the polymerization proceeds. Preferably, the sulfur compound may be further added when 50 to 99% of the polymerization proceeds. Meanwhile, unless otherwise specified, the phrase "when 50 to 99% of the polymerization proceeds", throughout the present specification, is defined as "when 50 to 99% by weight of the diiodo aromatic compound of the reactants are reacted and exhausted". If the addition is performed at that time, the molecular weight distribution of polyarylene sulfide may be close to the normal distribution, and more specifically, the ratio of the peak area of the polymer chain of the second polyarylene sulfide having a lower molecular weight than the maximum peak molecular weight to the peak area of the polymer chain of the first polyarylene sulfide having a higher molecular weight than the maximum peak molecular weight becomes 1.3 or less in the molecular weight distribution of the polyarylene sulfide, as measured by gel permeation chromatography using polystyrene as a standard. In addition, the step of further adding the sulfur compound may be performed once, or according to circumstances, one or more times, that is, in multiple steps, during the polymerization. In this case, the total amount of the sulfur compound added in multiple steps may preferably be 0.01 to 30 parts by weight, more preferably 0.1 to 20 parts by weight, and much more preferably 1.0 to 15 parts by weight, based on 100 parts by weight of the sulfur compound included in the initial reactants.

Meanwhile, in the step of further adding the sulfur compound in the preparation method, a polymerization terminator may be further added together with the sulfur compound, and the content of the added polymerization terminator may preferably be 0.01 to 10 parts by weight based on 100 parts by weight of the diiodo aromatic compound. If the content of the polymerization terminator is less than 0.01 parts by weight, the added polymerization terminator has little effect. If the content of the polymerization terminator is more than 10 parts by weight, polyarylene sulfide having an excessively low molecular weight may be prepared.

In this regard, the constitution of the polymerization terminator is not particularly limited, as long as it is able to terminate the polymerization by removing the iodine group included in the polymer to be polymerized. Preferably, the polymerization terminator may be one or more selected from the group consisting of diphenyl sulfide, diphenyl ether, diphenyl, benzophenone, diphenyl sulfide, diphenyl ether, diphenyl, benzophenone, monoiodoaryl compounds, benzothiazoles, benzothiazolesulfenamides, thiurams, dithiocarbamates, and diphenyldisulfide. More preferably, the polymerization terminator may be one or more selected from the group consisting of iodobiphenyl, iodophenol, iodo aniline, iodobenzophenone, 2-mercaptobenzothiazole, 2,2'-dithiobisbenzothiazole, N-cyclohexylbenzothiazole-2-sulfenamide, 2-morpholinothiobenzothiazole, N-dicyclohexyl-2-benzothiazolesulfenamide, tetramethylthiuram mono sulfide, tetramethylthiuram disulfide, zinc dimethyldithiocarbamate, zinc diethyldithiocarbamate, and diphenyl disulfide.

Much more preferably, the polymerization terminator may be diphenyl sulfide, diphenyl ether, or diphenyl, and the functional group between the phenyl groups of these polymerization terminators functions as an electron donor to improve the reactivity of the polymerization.

If the step of further adding the sulfur compound is performed once or more times during the polymerization step, the polymerization terminator may be added once in the first addition step of the sulfur compound, and according to circumstances, added at every step of further adding the sulfur compound.

The diiodo aromatic compound useful for the above polymerization of polyarylene sulfide may be one or more selected from the group consisting of diiodobenzene (DIB), diiodonaphthalene, diiodobiphenyl, diiodobisphenol, and diiodobenzophenone, but is not limited thereto. The diiodo aromatic compound may also be any one of these diiodo aromatic compounds that has an alkyl or sulfone substituent, or an aryl compound containing an oxygen or nitrogen atom. The diiodo aromatic compound can form distinctly different kinds of diiodo compound isomers according to the position of iodine substituents. The most preferable isomer of the diiodo compound is a compound having iodine substituents symmetrically positioned on both ends of the molecule at the longest distance from each other, such as pDIB, 2,6-diiodonaphthalene, or p,p'-diiodobiphenyl.

The useful sulfur compound is not specifically limited in its form. Normally, sulfur exists as cyclooctasulfur (S8) in the form of a ring consisting of eight sulfur atoms. However, the sulfur compound may be any kind of solid sulfur that is commercially available.

The diiodo aromatic compound may be added in an amount of 0.9 moles or more with respect to the sulfur compound. The content of the sulfur compound is preferably 15 to 30% by weight with respect to the weight of the polyarylene sulfide that is prepared from the diiodo aromatic compound and the sulfur compound via polymerization. The content of the sulfur compound within the above range ends up with a yield of polyarylene sulfide having enhanced thermal resistance and chemical resistance as well as excellent properties in regard to physical strength.

The conditions of the polymerization reaction are not limited, as long as the reactants including the diiodo aromatic compound, the sulfur compound, and the polymerization terminator are able to initiate the polymerization under the conditions. Preferably, the polymerization reaction may be initiated under the conditions of an elevated temperature and a reduced pressure. In this case, the temperature and pressure conditions are controlled to allow the polymerization reaction for 1 to 30 hours under initial reaction conditions of a temperature of 180 to 250° C. and a pressure of 50 to 450 Torr, and then under final reaction conditions of an elevated temperature of 270 to 350° C. and a reduced pressure of 0.001 to 20 Torr.

When the polymerization reaction is performed under the conditions of the elevated temperature and the reduced pressure, the product is excellent in terms of thermal stability, and when re-melted for recycling, the melt viscosity change rate is 0 or higher, which is defined as a change in the melt viscosity after thermal treatment to the initial melt viscosity of the resin, and thus the mechanical property is equivalent to or higher than that before recycling.

The preparation method of polyarylene sulfide according to the above-described embodiment may further include the step of melt-mixing the diiodo aromatic compound, the sulfur compound, and the polymerization terminator prior to the polymerization step. The above-described polymerization step is a melt polymerization step that is performed in the absence of an organic solvent. For the melt polymerization, the reactants including the diiodo aromatic compound are melt-mixed in advance, and then the polymerization can be performed.

The melt-mixing conditions are not limited, as long as all of the above-described reactants can be melt-mixed under the conditions, but preferably, at a temperature of 160 to 400° C., more preferably 170 to 350° C., and most preferably 250 to 320°.

The melt polymerization can be more easily performed by performing the melt-mixing step prior to the polymerization.

In the preparation method of polyarylene sulfide according to the above-described embodiment, the polymerization may be performed in the presence of a nitrobenzene catalyst. When the melt-mixing step is performed prior to the polymerization reaction, the catalyst may be added in the melt-mixing step. In the polymerization reaction, polyarylene sulfide polymerized in the presence of the nitrobenzene-based catalyst was found to have a higher melting point than that polymerized in the absence of the catalyst. When polyarylene sulfide having a low melting point is used, the products have a problem in the thermal resistance. Thus, for the preparation of polyarylene sulfide having good thermal resistance, the polymerization reaction can be performed in the presence of the nitrobenzene-based catalyst. The nitrobenzene-based catalyst may be exemplified by 1,3-diiodo-4-nitrobenzene, 1-iodo-4-nitrobenzene and the like, but is not limited thereto.

In the polyarylene sulfide prepared by the above-described method, a ratio of a peak area of the polymer chain of the second polyarylene sulfide having a lower molecular weight than the maximum peak molecular weight to a peak area of the polymer chain of the first polyarylene sulfide having a higher molecular weight than the maximum peak molecular weight is 1.3 or less in the molecular weight distribution of the polyarylene sulfide, as measured by GPC using polystyrene as a standard.

In addition, the difference in the contents of the first and second polyarylene sulfide polymer chains, the maximum peak molecular weight, the molecular weights of the first and second polyarylene sulfide polymer chains, the number average molecular weight, the polydispersity index defined as a ratio of the weight average molecular weight to the number average molecular weight, and the melting point of the polyarylene sulfide prepared by the above method are the same as mentioned in the above embodiments.

Meanwhile, still another embodiment of the present invention provides a product manufactured by molding the polyarylene sulfide.

The product may be molded products, films, sheets, or fabrics. In particular, if the product is a molded product, it may be a molded product for connectors, electrical molded products, materials for covering electric microwires, ultra thin film molded products or the like, which require high molding precision.

The polyarylene sulfide of the present invention may be processed into any kind of molded products by injection molding or extrusion molding. Examples of the molded products may include injection-molded products, extrusion-molded products, or blow molded products.

As for injection molding, the molding temperature is preferably 30° C. or higher, more preferably 60° C. or higher, and much more preferably 80° or higher in the aspect of crystallization; and preferably 150° C. or lower, more preferably 140° C. or lower, much more preferably 130° C. or lower in the aspect of the deformation of test species. These molded products may be used for electrical/electronic parts, building components, automotive components, mechanical parts, daily-use articles, and so forth.

The films or sheets may be prepared in the form of any kind of film such as a non-oriented film, uniaxially or biaxially oriented film, or sheets. The fabrics may be prepared in the form of any kind of fabrics such as non-oriented fabric, oriented fabric, or ultra-oriented fabric, and may be used as woven fabric, knitted fabric, nonwoven fabric (spoon bond, melt blow, or staple), ropes, nets, or the like.

ADVANTAGEOUS EFFECT OF THE INVENTION

The present invention provides polyarylene sulfide (PAS) that exhibits excellent processability and generates no burrs or the like, and can satisfactorily mold a product requiring high molding precision, and molded products using the same.

DETAILS FOR PRACTICING THE INVENTION

Figure 1:
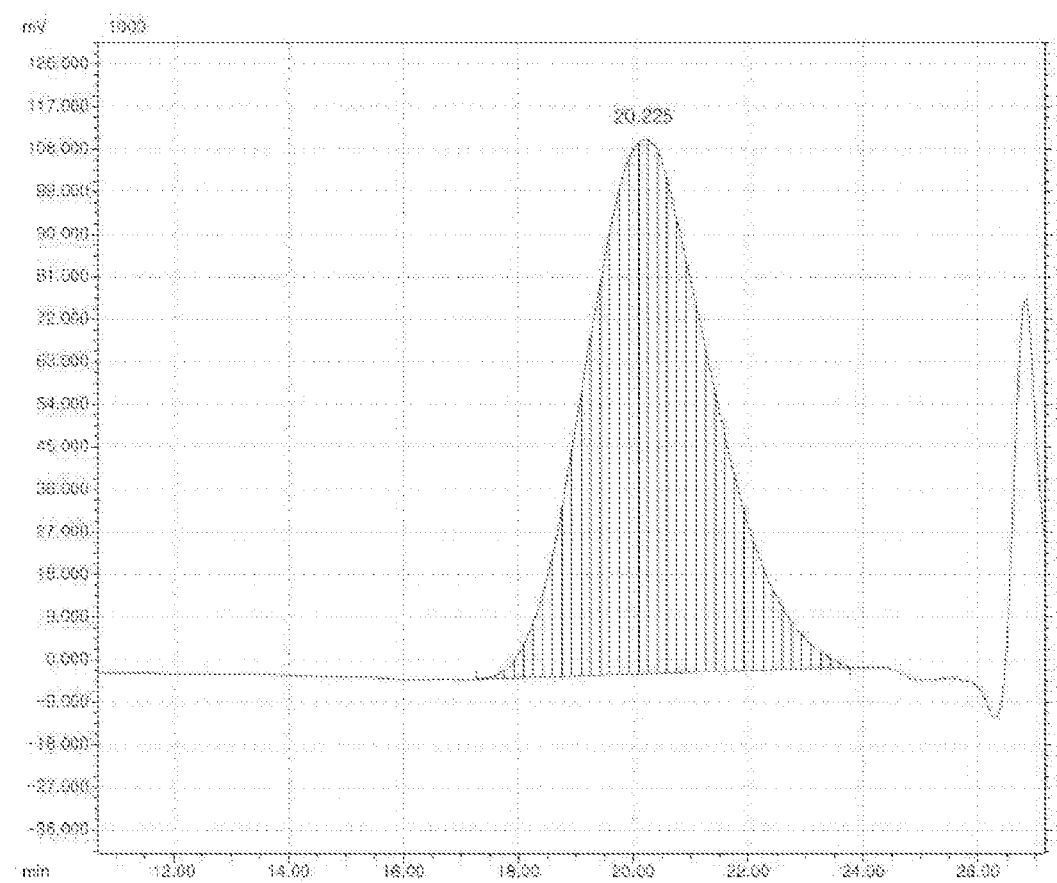
FIG. 1 shows a molecular weight distribution curve of the polyarylene sulfide according to Example 4.

The present invention will be described in more detail with reference to the following examples. However, these examples are for illustrative purposes only, and the invention is not intended to be limited by these examples. Hereinafter, the polyarylene sulfide is described as "PAS".

Example

PAS Polymerization

1. PAS Polymerization of Example 1

The reactants including 400 g of a diiodo aromatic compound, para-diiodobenzene, 34 g of crystalline sulfur, and 1.0 g of 1,3-diiodo-4-nitrobenzene were melt-mixed at 180° C. The melt mixture was polymerized at an elevated temperature of from 180° C. to 340° C. and at a reduced pressure from atmospheric pressure to 10 Torr. Four hours after initiation of the polymerization, 0.5 g of sulfur was added and the polymerization reaction was performed for a further 1 hour so as to obtain a polymer.

The produced polymer had M.V. of 914 poise and Tm of 281° C.

2. PAS Polymerization of Example 2

The reactants including 400 g of a diiodo aromatic compound, para-diiodobenzene, 34 g of crystalline sulfur, and 1.0 g of 1,3-diiodo-4-nitrobenzene were melt-mixed at 180° C. The melt mixture was polymerized at an elevated temperature from 180° C. to 340° C. and at a reduced pressure from atmospheric pressure to 10 Torr. 4 hours after initiation of the polymerization, 0.5 g of sulfur was added, and 5 hours after initiation of the polymerization, 0.5 g of sulfur was further added. Then, the polymerization reaction was performed for further 1 hour so as to obtain a polymer.

The produced polymer had M.V. of 751 poise and Tm of 282° C.

3. PAS Polymerization of Example 3

The reactants including 400 g of a diiodo aromatic compound, para-diiodobenzene, 34 g of crystalline sulfur, and 1.0 g of 1,3-diiodo-4-nitrobenzene were melt-mixed at 180° C. The melt mixture was polymerized at an elevated temperature from 180° C. to 340° C. and at a reduced pressure from atmospheric pressure to 10 Torr. Four hours after initiation of the polymerization, 0.5 g of sulfur was added, and 5 hours after initiation of the polymerization, 0.5 g of sulfur was further added, and subsequently 6 hours after initiation of the polymerization, 0.5 g of sulfur was further added. Then, the polymerization reaction was performed for a further 1 hour so as to obtain a polymer.

The produced polymer had M.V. of 1465 poise and Tm of 281° C.

4. PAS Polymerization of Example 4

The reactants including 400 g of a diiodo aromatic compound, para-diiodobenzene, 34 g of crystalline sulfur, and 1.0 g of 1,3-diiodo-4-nitrobenzene were melt-mixed at 180° C. The melt mixture was polymerized at an elevated temperature from 180° C. to 340° C. and at a reduced pressure from atmospheric pressure to 10 Torr. Five hours after initiation of the polymerization, 0.5 g of sulfur was added and the polymerization reaction was performed for a further 1 hour so as to obtain a polymer.

The produced polymer had M.V. of 1659 poise and Tm of 281° C.

5. PAS Polymerization of Example 5

The reactants including 400 g of a diiodo aromatic compound, para-diiodobenzene, 34 g of crystalline sulfur, and 1.0 g of 1,3-diiodo-4-nitrobenzene were melt-mixed at 180° C. The melt mixture was polymerized at an elevated temperature from 180° C. to 340° C. and at a reduced pressure from atmospheric pressure to 10 Torr. Five hours after initiation of the polymerization, 0.5 g of sulfur was added, and 6 hours after initiation of the polymerization, 0.5 g of sulfur was further added. Then, the polymerization reaction was performed for a further 1 hour so as to obtain a polymer.

The produced polymer had M.V. of 2660 poise and Tm of 280° C.

6. PAS Polymerization of Example 6

The reactants including 400 g of a diiodo aromatic compound, para-diiodobenzene, 34 g of crystalline sulfur, and 1.0 g of 1,3-diiodo-4-nitrobenzene were melt-mixed at 180° C. The melt mixture was polymerized at an elevated temperature from 180° C. to 340° C. and at a reduced pressure from atmospheric pressure to 10 Torr. Five hours after initiation of the polymerization, 0.5 g of sulfur was added, and 6 hours after initiation of the polymerization, 0.5 g of sulfur was further added, and subsequently 7 hours after initiation of the polymerization, 0.5 g of sulfur was further added. Then, the polymerization reaction was performed for a further 1 hour so as to obtain a polymer.

The produced polymer had M.V. of 2473 poise and Tm of 281° C.

7. PAS Polymerization of Example 7

The reactants including 400 g of a diiodo aromatic compound, para-diiodobenzene, 34 g of crystalline sulfur, and 1.0 g of 1,3-diiodo-4-nitrobenzene were melt-mixed at 180° C. The melt mixture was polymerized at an elevated temperature from 180° C. to 340° C. and at a reduced pressure from atmospheric pressure to 10 Torr. Six hours after initiation of the polymerization, 0.5 g of sulfur was added and the polymerization reaction was performed for a further 1 hour so as to obtain a polymer.

The produced polymer had M.V. of 1610 poise and Tm of 281° C.

8. PAS Polymerization of Example 8

The reactants including 400 g of a diiodo aromatic compound, para-diiodobenzene, 34 g of crystalline sulfur, and 1.0 g of 1,3-diiodo-4-nitrobenzene were melt-mixed at 180° C. The melt mixture was polymerized at an elevated temperature from 180° C. to 340° C. and at a reduced pressure from atmospheric pressure to 10 Torr. Six hours after initiation of the polymerization, 0.5 g of sulfur was added, and 7 hours after initiation of the polymerization, 0.5 g of sulfur was further added. Then, the polymerization reaction was performed for a further 1 hour so as to obtain a polymer.

The produced polymer had M.V. of 2530 poise and Tm of 280° C.

9. PAS Polymerization of Example 9

The reactants including 400 g of a diiodo aromatic compound, para-diiodobenzene, 34 g of crystalline sulfur, and 1.0 g of 1,3-diiodo-4-nitrobenzene were melt-mixed at 180° C. The melt mixture was polymerized at an elevated temperature from 180° C. to 340° C. and at a reduced pressure from atmospheric pressure to 10 Torr. Six hours after initiation of the polymerization, 0.5 g of sulfur was added, and 7 hours after initiation of the polymerization, 0.5 g of sulfur was further added, and subsequently 8 hours after initiation of the polymerization, 0.5 g of sulfur was further added. Then, the polymerization reaction was performed for a further 1 hour so as to obtain a polymer.

The produced polymer had M.V. of 2622 poise and Tm of 280° C.

The reactants of the polymerization reactions of the above-described examples and the addition amounts thereof, the addition amount of the sulfur compound further added during the polymerization, and the addition time are shown in the following Table 1. During the polymerization reactions of the examples, the polymerization terminator was added together with sulfur at the first time of adding sulfur at an amount shown in the following Table 1.

Comparative Example

PAS Polymerization

1. PAS Polymerization of Comparative Example 1

PAS manufactured by Celanese was prepared. The prepared polymer had a melt viscosity (hereinafter abbreviated to M.V.) of 2103 poise and a melting point (hereinafter abbreviated to Tm) of 282° C.

2. PAS Polymerization of Comparative Example 2

PAS of Fortron (0205P4 Grade) was prepared. The prepared polymer had M.V. of 628 poise and Tm of 282° C.

3. PAS Polymerization of Comparative Example 3

PAS of Deyang was prepared. The prepared polymer had M.V. of 2443 poise and Tm of 281° C.

Experimental Example

Property Measurement of PASs of Comparative Examples and Examples

1. Analysis of Molecular Weight

The sample to be analyzed was dissolved in 1-chloronaphthalene at 210° C. for 6 hours at a concentration of 1 wt %, and then measurement was performed at 210° C. using polystyrene as a standard. At this time, "Pl gel 220" was used as a molecular weight measuring instrument GPC, an RI detector was used as a detector, and PLgel 5 μm Mixed-D×3 EA was used as a column. The flow rate was 1 ml/min, and PL Gel was used as a pump. Five ml of a solvent and 0.01 g of the sample were injected for measurement.

2. Calculation of Molecular Weight Distribution

By analyzing the molecular weight distribution through the GPC measurement of the examples and comparative examples, the maximum peak molecular weight, the number average molecular weight, the content of the polymer chain of the first PAS, that is, the peak area of the polymer chain having a higher molecular weight than the maximum peak molecular weight (namely, having a short retention time, based on the maximum peak point of polyarylene sulfide) and the content of the polymer chain of the second PAS, that is, the peak area of the polymer chain having a lower molecular weight than the maximum peak molecular weight (namely, having a long retention time, based on the maximum peak point of polyarylene sulfide) are shown in the following Table 2.

Figure 2:
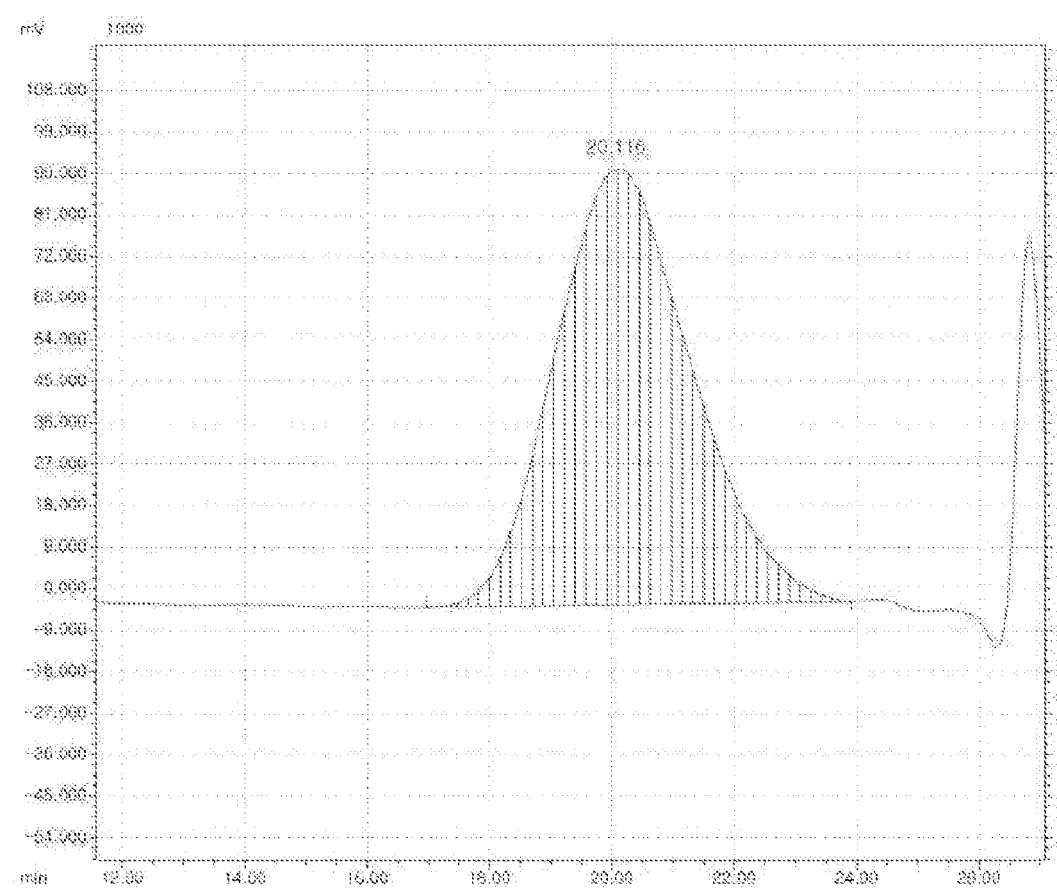
FIG. 2 shows a molecular weight distribution curve of the polyarylene sulfide according to Example 7.

Meanwhile, the molecular weight distribution curve of the polyarylene sulfide according to Example 4 and the molecular weight distribution curve of the PAS according to Example 7 are shown in FIGS. 1 and 2, respectively. As shown in FIGS. 1 and 2, the molecular weight distribution curve of the polyarylene sulfide according to the examples was a single peak distribution curve, and is similar to the normal distribution curve. The maximum peak values of FIGS. 1 and 2 represent the retention time value before calibrating the molecular weight using polystyrene as a standard.

3. Analysis of Melt Viscosity

In the analysis of physical properties of the polymers prepared according to the comparative examples and examples, melt viscosity (hereinafter, abbreviated to M.V.) was measured using a rotating disk viscometer at 300° C. In the measurement by frequency sweep, angular frequency was measured at 0.6 to 500 rad/s, and the viscosity at 1.84 was defined as the melting viscosity. The values are shown in Table 3.

4. Measurement of Melting Point (Tm)

The melting point was measured using a differential scanning calorimeter (DSC) by elevating the temperature from 30° C. to 320° C. at a rate of 10° C./min, then decreasing the temperature to 30° C., and then again elevating the temperature from 30° C. to 320° C. at a rate of 10° C./min. The measured values are shown in Table 3.

5. Analysis of Wt % of Disulfide

A small amount of the sample (approximately 2 mg) was burned using an AQF (automatic quick furnace) at 1000° C., and sulfur gas was captured using an absorbing solution (hydrogen peroxide) and ionized. Then, sulfur ions were isolated from the column by IC (ion chromatography), and the sulfur content was quantified using a sulfur ion standard ($K_2SO_4$). Differences between the measured sulfur content and the theoretical sulfur content were calculated as disulfide, and the results are shown in Table 3.

6. Measurement of Flowability of Polymer (Spiral Test)

To measure flowability of the polymerized polymer, the commonly used spiral test was performed. To perform the test, all of the polymer samples extruded from the polymerization reactor were cut in a form of pellets having a diameter of 1-2 mm and a length of 2-4 mm, and the maximum injection pressure, the injection volume, the injection speed, the injection pressure, and the holding pressure within an injector were maintained constant. The injection temperature was fixed at 320° C., based on the barrel. Specifically, polyarylene sulfides according to the examples and comparative examples were melted in the injector, and then injected under the conditions of a maximum injection pressure of 1500 kgf/cm², an injection volume of 20 ml, each injection speed of 30 mm/s, 30 mm/s, and 25 mm/s, an injection pressure of 1450 kgf/cm², an injection temperature of 320° C. in the injection machine with a spiral mold with a longitudinal section having a semi-circular flow path with a diameter of 6 mm and a maximum height of 2.6 mm, and a cross-section having a spiral flow path with a length of 150 mm. Then, the final length of the injection-molded product separated from the spiral cast was measured, and the measured values are as shown in Table 3. The final length of the injection-molded product is described as "length of injection-molded product" in the following Table 3.

7. Measurement of Burr Generation Upon Manufacture of Molding Product

Meanwhile, the above-described spiral test was performed using the polymers of the comparative examples and examples, and the amounts of burrs were determined by the weight measured after cutting a thin part between front and back plates, except for the main shape of the mold used in the spiral test, and are shown in the following Table 3.

The amount of burr generation to the weight of the injection-molded product separated from the cast in the spiral test was defined as "burr generation weight ratio", which is shown in the following Table 3.

TABLE 1

| | Reactants of Example | | | | Time of further addition of S (h)[note] | Time of reaction termination (h)[note] |
|---|---|---|---|---|---|---|
| | pDIB (g) | S (g) | Catalyst (g) | Polymerization terminate (g) | S further added (g) | |
| Example 1 | 400 | 34 | 1.0 | 1.0 | 0.5 | 4 | 5 |
| Example 2 | 400 | 34 | 1.0 | 1.0 | 1.0 | 4, 5 | 6 |
| Example 3 | 400 | 34 | 1.0 | 1.0 | 1.5 | 4, 5, 6 | 7 |
| Example 4 | 400 | 34 | 1.0 | 1.0 | 0.5 | 5 | 6 |
| Example 5 | 400 | 34 | 1.0 | 1.0 | 1.0 | 5, 6 | 7 |
| Example 6 | 400 | 34 | 1.0 | 1.0 | 1.5 | 5, 6, 7 | 8 |
| Example 7 | 400 | 34 | 1.0 | 1.0 | 0.5 | 6 | 7 |
| Example 8 | 400 | 34 | 1.0 | 1.0 | 1.0 | 6, 7 | 8 |
| Example 9 | 400 | 34 | 1.0 | 1.0 | 1.5 | 6, 7, 8 | 9 |

[note] time of further addition of S and time of reaction termination are based on time of reaction initiation.

TABLE 2

| | Maximum peak molecular weight | Number average molecular weight | Area of polymer chain of first PAS | Area of polymer chain of second PAS | Peak area ratio of polymer chains of first and second PAS |
|---|---|---|---|---|---|
| Comparative Example 1 | 56,886 | 26,266 | 39.9 | 60.1 | 1.50 |
| Comparative Example 2 | 41,009 | 20,066 | 41.1 | 58.9 | 1.43 |
| Comparative Example 3 | 41,179 | 18,000 | 40.9 | 59.1 | 1.44 |
| Example 1 | 15,805 | 8,721 | 45.5 | 54.5 | 1.20 |
| Example 2 | 17,912 | 10,063 | 48.1 | 52.8 | 1.10 |
| Example 3 | 20,325 | 7,769 | 50.0 | 50.0 | 1 |
| Example 4 | 17,266 | 9,422 | 48.3 | 51.7 | 1.07 |
| Example 5 | 18,776 | 10,152 | 47.5 | 52.5 | 1.11 |
| Example 6 | 25,387 | 12,700 | 46.2 | 53.8 | 1.16 |
| Example 7 | 18,804 | 9,970 | 48.4 | 51.6 | 1.07 |
| Example 8 | 24,351 | 12,316 | 44.3 | 55.7 | 1.26 |
| Example 9 | 26,738 | 13,876 | 43.7 | 56.3 | 1.29 |

TABLE 3

| | M.V. (Poise) | Tm (° C.) | Disulfide content (wt %) | Length of injection-molded product (cm) | Burr generation amount (g) | Burr generation weight ratio (wt %) |
|---|---|---|---|---|---|---|
| Comparative Example 1 | 2103 | 282 | N.D. | 60 | 0.52 | 4.3 |
| Comparative Example 2 | 628 | 282 | N.D. | 62 | 0.63 | 5.0 |
| Comparative Example 3 | 2443 | 281 | N.D. | 53 | 0.37 | 3.3 |

TABLE 3-continued

|  | M.V. (Poise) | Tm (° C.) | Disulfide content (wt %) | Length of injection-molded product (cm) | Burr generation amount (g) | Burr generation weight ratio (wt %) |
|---|---|---|---|---|---|---|
| Example 1 | 914 | 281 | 1.8 | 59 | 0.07 | 0.58 |
| Example 2 | 751 | 282 | 1.8 | 61 | 0.05 | 0.40 |
| Example 3 | 1465 | 281 | 1.6 | 56 | 0.01 | 0.09 |
| Example 4 | 1659 | 281 | 1.0 | 57 | 0.0 | 0 |
| Example 5 | 2660 | 280 | 0.2 | 50 | 0.0 | 0 |
| Example 6 | 2473 | 281 | 0.5 | 51 | 0.0 | 0 |
| Example 7 | 1610 | 281 | 1.2 | 55 | 0.0 | 0 |
| Example 8 | 2530 | 280 | 0.6 | 51 | 0.01 | 0.09 |
| Example 9 | 2622 | 280 | 0.3 | 49 | 0.0 | 0 |

As shown in Tables 2 and 3, in the PAS according to the examples of the present invention, a ratio of a peak area of a polymer chain of the second PAS to a peak area of a polymer chain of the first PAS was 1.3 or less in the molecular weight distribution of PAS as measured by GPC using polystyrene as a standard, and the injection-molded product had a length of 40 cm or longer, thereby showing excellent flowability and processability. In addition, no burrs were generated or a trace amount of burrs was generated.

Specifically, all of the PAS of the examples showed a burr generation weight ratio of 1 wt % or less, which is defined by the amount of burr generation to the weight of the injection-molded product in the spiral test, indicating improved flowability and minimal burr generation.

In contrast, in the PAS of the comparative examples, a peak area ratio of the polymer chains of the first and second PAS was 1.4 or more, and the content of the polymer chain having a relatively low molecular weight was too high. Therefore, the length of the injection-molded product was similar to or slightly longer than those of the present invention, but the amount of burr generation was largely 60 times higher than those of the PAS according to the examples of the present invention. The results of the examples and comparative examples showed that polyarylene sulfide according to the present invention and the preparation method thereof are expected to be widely applied in manufacture of precision molding parts requiring high molding precision.

What is claimed is:

1. A polyarylene sulfide comprising a polymer chain of a first polyarylene sulfide having a higher molecular weight than the maximum peak molecular weight and a polymer chain of a second polyarylene sulfide having a lower molecular weight than the maximum peak molecular weight, as measured by gel permeation chromatography using polystyrene as a standard,
   wherein a ratio of a peak area of the polymer chain of the second polyarylene sulfide to a peak area of the polymer chain of the first polyarylene sulfide is 1.3 or less, and
   the number average molecular weight of the polyarylene sulfide is 3,000 to 100,000, and
   the maximum peak molecular weight is 12,000 to 60,000.

2. The polyarylene sulfide according to claim 1, wherein the ratio of the peak area of the polymer chain of the second polyarylene sulfide to the peak area of the polymer chain of the first polyarylene sulfide is 1.2 or less.

3. The polyarylene sulfide according to claim 1, wherein the ratio of the peak area of the polymer chain of the second polyarylene sulfide to the peak area of the polymer chain of the first polyarylene sulfide is 1.1 or less.

4. The polyarylene sulfide according to claim 1, wherein the polymer chain of the first polyarylene sulfide has a molecular weight of 12,000 to 900,000, and the polymer chain of the second polyarylene sulfide has a molecular weight of 330 to 80,000.

5. The polyarylene sulfide according to claim 1, wherein a polydispersity index, defined as a ratio of the weight average molecular weight to the number average molecular weight, is 2.0 to 4.0.

6. The polyarylene sulfide according to claim 1, wherein the melting point is 265 to 320° C.

7. The polyarylene sulfide according to claim 1, wherein the injection-molded product has a length of 40 cm or longer, when the polyarylene sulfide is melted in an injection machine, and then injected under the conditions of a maximum injection pressure of 1500 kgf/cm$^2$, an injection volume of 20 ml, each injection speed of 30 mm/s, 30 min/s, and 25 mm/s, an injection pressure of 1450 kgf/cm$^2$, an injection temperature of 32.0° C. in the injection machine with a spiral mold that has a longitudinal section having a semi-circular flow path with a diameter of 6 mm and a maximum height of 2.6 mm, and a cross-sectional section having a spiral flow path with a length of 150 mm.

8. The polyarylene sulfide according to claim 7, wherein a burr generation weight ratio, defined as an amount of generated burrs to the weight of the injection-molded product, is 1% by weight or less.

9. The polyarylene sulfide according to claim 1, wherein a disulfide repeating unit amount included in the polyarylene sulfide is 3% by weight or less, based on the total weight of polyarylene sulfide.

10. A method for preparing the polyarylene sulfide of claim 1, comprising the steps of:
    polymerizing reactants including a diiodo aromatic compound and a sulfur compound; and
    further adding an additional sulfur compound at 0.01 to 30 parts by weight, based on 100 parts by weight of the sulfur compound included in the reactants, while maintaining the polymerization step.

11. The method according to claim 10, wherein the sulfur compound is further added then 50 to 99% of the polymerization proceeds.

12. The method according to claim 10, wherein the step of further adding the sulfur compound during the polymerization step is performed one or more times.

13. The method according to claim 10, wherein in the step of further adding the sulfur compound, 0.01 to 10 parts by weight of a polymerization terminator is further added together with the sulfur compound, based on 100 parts by weight of the diiodo aromatic compound included in the reactants.

14. The method according to claim 10, wherein the content of the diiodo aromatic compound in the reactants is 0.9 moles or more with respect to the sulfur compound included in the reactants.

15. The method according to claim 13, wherein the polymerization terminator is one or more selected from the group consisting of iodobiphenyl, iodophenol, iodoaniline, iodobenzophenone, 2-mercaptobenzothiazole, 2,2'-dithiobisbenzothiazole, N-cyclohexylbenzothiazole-2-sulfenamide, 2-morpholinothiobenzothiazole, N-dicyclohexylbenzothiazole-2-sulfenamide, tetramethylthiuram monosulfide, tetramethylthiuram disulfide, zinc dimethyldithiocarbamate, zinc diethyldithiocarbamate, and diphenyl disulfide.

16. The method according to claim 10, wherein the diiodo aromatic compound is one or more selected from the group consisting of diiodobenzene, diiodonaphthalene, diiodobiphenyl, diiodobisphenol, and diiodobenzophenone.

17. The method according to claim 10, wherein the polymerization reaction is performed for 1 to 30 hours under initial reaction conditions of a temperature of 180 to 250° C. and a pressure of 50 to 450 Torr, and then under final reaction conditions of an elevated temperature of 270 to 350° C. and a reduced pressure of 0.001 to 20 Torr.

18. The method according to claim 10, further comprising the step of melt-mixing the reactants including the diiodo aromatic compound, the sulfur compound, and the polymerization terminator, prior to the polymerization step.

19. The method according to claim 10, wherein the polymerization reaction is performed in the presence of a nitrobenzene-based catalyst.

20. A product manufactured by molding the polyarylene sulfide according to claim 1.

21. The product according to claim 20, wherein the product is a molded product, a film, a sheet, or a fabric.

\* \* \* \* \*

UNITED STATES PATENT AND TRADEMARK OFFICE
CERTIFICATE OF CORRECTION

PATENT NO.       : 9,546,248 B2
APPLICATION NO.  : 13/697282
DATED            : January 17, 2017
INVENTOR(S)      : Park et al.

It is certified that error appears in the above-identified patent and that said Letters Patent is hereby corrected as shown below:

In the Claims

In Column 16, Line 27, in Claim 6, delete "265 to 320° C." and insert --265 °C. to 320 °C.-- therefor In Column 16, Line 33, in Claim 7, delete "min/s," and insert --mm/s,-- therefor In Column 16, Line 35, in Claim 7, delete "32.0°C." and insert --320 °C.-- therefor In Column 16, Line 57, in Claim 11, delete "then" and insert --when-- therefor In Column 18, Line 3, in Claim 17, delete "180 to 250° C." and insert --180 °C. to 250 °C.-- therefor In Column 18, Line 5-6, in Claim 17, delete "270 to 320° C." and insert --270 °C. to 320 °C.-- therefor Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*